Patented Sept. 18, 1928.

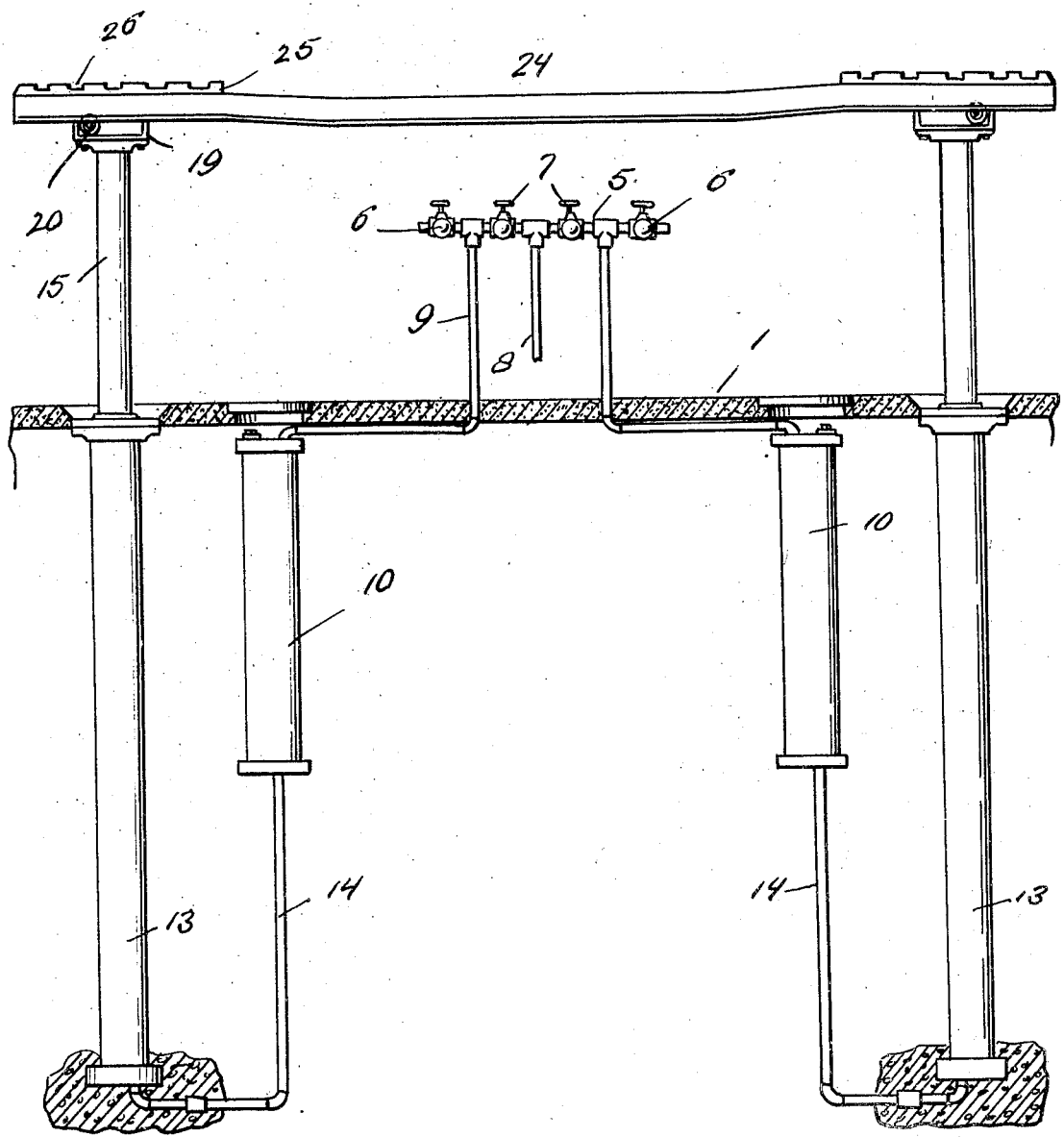

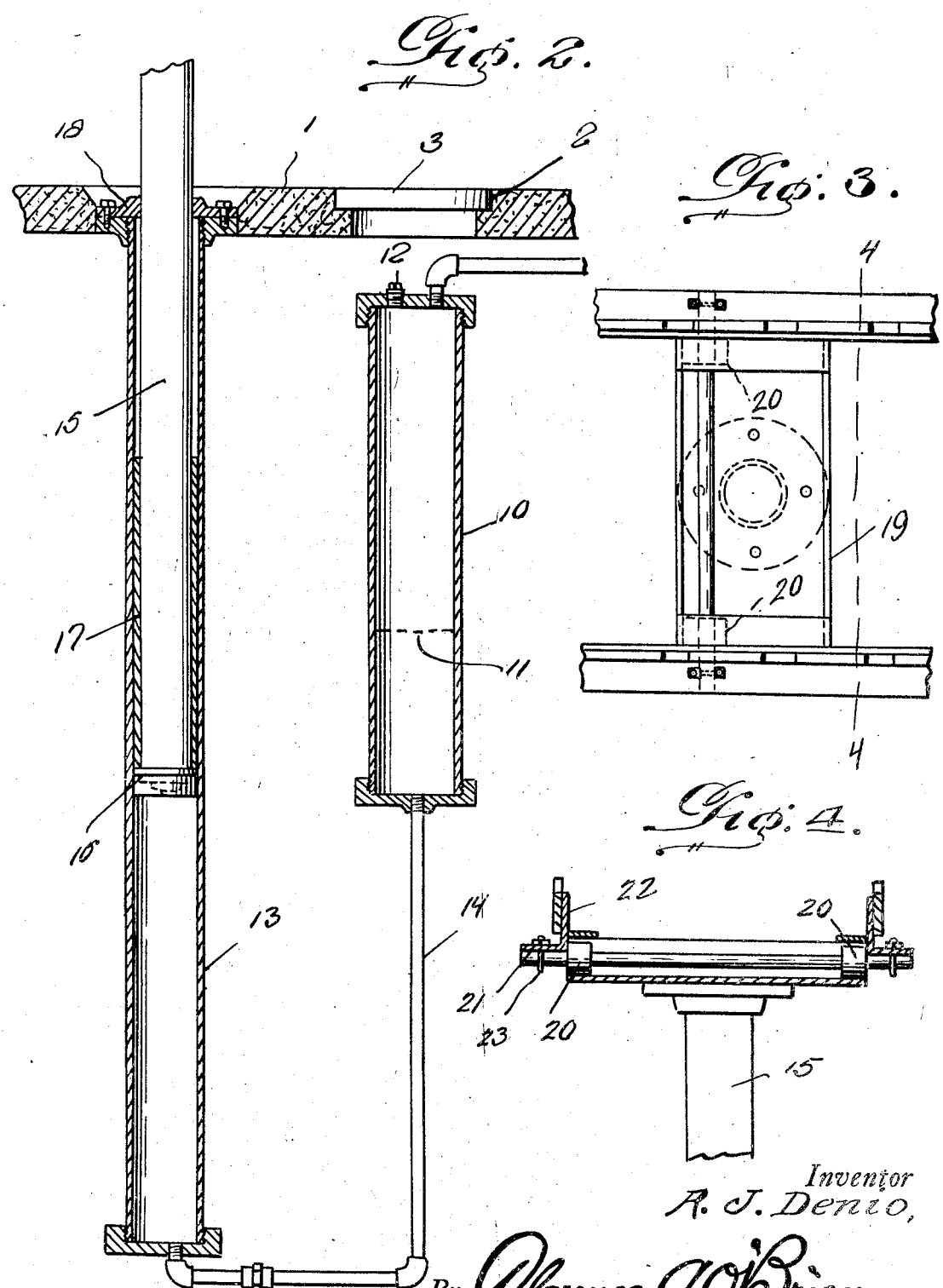

1,684,729

UNITED STATES PATENT OFFICE.

ROBERT J. DENIO, OF OAKLAND, CALIFORNIA, ASSIGNOR TO ROBERT DENIO, OF MODESTO, CALIFORNIA.

AUTOMOBILE ELEVATING APPARATUS.

Application filed February 1, 1926. Serial No. 85,315.

My present invention has to do with means for elevating automobiles with a view to facilitating operations on the under parts thereof; and it contemplates the provision of an automobile elevating apparatus, efficient in operation and susceptible of easy control and possessed of the several practical advantages hereinafter ascribed to it.

To the attainment of the foregoing, the invention consists in the improvement as hereinafter described and definitely claimed.

In the accompanying drawings, forming part of this specification:—

Figure 1 is a side elevation, with parts in section, illustrating the best practical embodiment of my invention of which I am cognizant.

Figure 2 is an enlarged detail longitudinal vertical section showing one end portion of the apparatus.

Figure 3 is a fragmentary plan view on an enlarged scale illustrative of portions of one piston and the cradle upon which an automobile is rested.

Figure 4 is a transverse section taken in the plane indicated by the line 4—4 of Figure 3.

Similar numerals of reference designate corresponding parts in all of the views of the drawings.

I show in Figures 1 and 2, a floor or platform 1 with openings 2, and normally closed by removable covers 3. I also show in Figure 1 and in a horizontal plane above the floor 1 so as to be convenient of operation the control means of my improvement, the said control means comprising by preference a head pipe 5, end valves 6, intermediate valves 7, a pipe 8 connected with the pipe 5 at a point between the valve 7 and adapted to be connected with a source of compressed air supply, and pipes 9 leading from the pipe 5 at a point between the valves 6 and 7.

At 10, I employ surge chambers, designed to contain oil, designated by 11, the upper ends of the said chambers 10 being connected with the pipes 9, and being provided by preference with removable plugs 12.

Arranged alongside the chambers 10 and extending above and below the same are upright piston cylinders 13, the lower ends of which are connected with the lower ends of the chambers 10 through the medium of pipes 14. Movable rectilinearly in the cylinders 13 are piston rods 15 having at their lower ends heads which are packed, by preference, by cup leathers 16. Surrounding the lower portions of the piston rods 15 and superposed on the mentioned heads thereof are stop sleeves 17, open at their upper ends. The upper ends of the cylinders 13 are closed by annular heads 18, appropriately connected with the cylinders and countersunk in the floor or platform 1.

Heads 19 are employed at the upper ends of the piston rods 15 and arranged in said heads 19 and movable longitudinally of the apparatus with respect to the heads 19 are anti-friction rollers 20, Figures 1, 3 and 4. Superposed at 21 on the anti-friction rollers 20 or more specifically on the trunnions of said rollers 20 are longitudinally disposed angle bars 22, the horizontal portions of which are connected to the said trunnions by shackles 23. The longitudinally disposed angle bars 22 are comprised in a cradle 24 which is supported by the piston rods 15 and has a limited longitudinal movement with respect thereto. It will also be understood by comparison of Figures 1, 3 and 4 that the cradle 24 is provided with longitudinal portions 25 adjacent to its ends, which longitudinal portions 25 are provided with what I designate as safety notches, the said notches being designed to seat axle portions of an automobile with a view to safeguarding an automobile against sliding off the cradle 24.

Manifestly in the practical use of my novel apparatus, the rollers 20 movable in the heads 19 are adapted to compensate for the different relative positions of the ends of the lifting cradle 24 when one end thereof is lifted higher than the other, and by virtue of said provision it is feasible for the operator of my novel apparatus to raise one end of a motor vehicle while permitting the other thereof to rest upon the floor 1.

The chambers 10 are approximately of the same displacement as the piston cylinders 13, and in the operation of the apparatus, the oil or other liquid 11 is forced from the chambers 10 into the cylinders 13 by compressed air or by other fluid under pressure. Manifestly the weight of the automobile while being lifted is imposed directly on the cradle 24 which engages the front and rear axles of the automobile at points near the wheels, and consequently when the automobile is elevated the wheels may be readily moved about their axes as desired.

It will be apparent from the foregoing that incident to the operation of my novel apparatus, two elevating pistons operate under the longitudinal central portion of a motor vehicle, and that the compensating means disclosed takes care of differences in the height of ends of the lifting cradle 24. It will also be appreciated that by virtue of my improvement the operator of the apparatus has complete control of each piston and its appurtenances independently of the other piston and the appurtenances thereof; and it will further be noted that the weight of the elevated automobile is carried by the front and rear axles thereof resting directly on and in engagement with the cradle 24.

In addition to the practical advantages ascribed to my novel apparatus in the foregoing, it will be noted that the apparatus as a whole is simple and inexpensive in construction, is susceptible of ready installation, and is well adapted in general to withstand the usage to which apparatus of corresponding character is ordinarily subjected.

My novel apparatus as disclosed has been reduced to actual practice and successfully operated, and I therefore prefer to employ the illustrated embodiment in all of its details. I do not desire, however, to be understood as limiting myself to the precise construction and relative arrangement of elements as set forth, my invention being defined by my appended claim within the scope of which changes in structure and changes in arrangement may be made without departure from my invention.

Having described my invention, what I claim and desire to secure by Letters Patent, is:—

In an automobile elevating apparatus wherein a cradle is employed to rest under the axle portion of an automobile and is connected with means for elevating and permitting of gravitation of the end portions of the cradle, means constituting one of the connections and comprising angle irons carried by one end portion of the cradle and having upwardly directed lower portions, anti-friction rollers having trunnions disposed under said horizontal portion of the angle iron, shackles straddling said trunnions and connecting the same with the horizontal portions of the angle irons, and a head on one of the elevating means, having confining means therein for the said anti-friction rollers, whereby said rollers in connection with the cradle are enabled to move longitudinally of the apparatus.

In testimony whereof I affix my signature.

ROBERT J. DENIO.